(12) United States Patent
Tipu (10) Patent No.: US 7,347,650 B2
(45) Date of Patent: Mar. 25, 2008

(54) CUTTING TOOL WITH LOCKING PIN

(76) Inventor: Vichente Tipu, 4 Allview Crescent, North York (CA) M2J 2R3

( * ) Notice: Subject to any disclaimer, the term of this patent is extended or adjusted under 35 U.S.C. 154(b) by 253 days.

(21) Appl. No.: 11/163,390

(22) Filed: Oct. 17, 2005

(65) Prior Publication Data

US 2007/0086863 A1    Apr. 19, 2007

(51) Int. Cl.
  *B23B 27/16* (2006.01)
(52) U.S. Cl. .................. 407/105; 407/104; 407/66; 407/107; 407/101
(58) Field of Classification Search ........ 407/101–107, 407/40, 47, 66; *B23B 27/16*
  See application file for complete search history.

(56) References Cited

U.S. PATENT DOCUMENTS

| | | | | |
|---|---|---|---|---|
| 3,314,126 A | * | 4/1967 | Stier | 407/105 |
| 3,316,616 A | * | 5/1967 | Milewski | 407/105 |
| 3,393,435 A | * | 7/1968 | Viellet | 407/105 |
| 3,777,341 A | * | 12/1973 | Faber | 407/114 |
| 3,792,516 A | * | 2/1974 | Mihic | 407/105 |
| 3,889,332 A | * | 6/1975 | Mihic | 407/105 |
| 3,902,232 A | * | 9/1975 | Hertel | 407/104 |
| 3,973,309 A | * | 8/1976 | Kummer | 407/104 |
| 4,487,533 A | * | 12/1984 | Wermeister | 407/105 |
| 4,615,650 A | * | 10/1986 | Hunt | 407/105 |
| 4,632,593 A | * | 12/1986 | Stashko | 403/316 |
| 4,890,961 A | * | 1/1990 | Carl et al. | 407/105 |
| 6,773,210 B2 | * | 8/2004 | Erickson | 407/102 |

FOREIGN PATENT DOCUMENTS

EP        161505 A1 * 11/1985

* cited by examiner

*Primary Examiner*—Monica Carter
*Assistant Examiner*—Sara Addisu (57) ABSTRACT

A cutting tool for chip removing including a cutting insert provided with a through hole, a J shaped locking pin actuated by a locking screw, and a tool holder having means to receive the cutting insert, the locking screw and the locking pin. The cutting insert is positioned in place by passing its hole over the clamping head of the locking pin and is securely locked into the tool holder's receiving pocket in both horizontally and vertically directions. For some embodiments the insert is clamped due to a simultaneous tilting and downward sliding movement of the locking pin while for other embodiments the insert is clamped due to both a horizontal and a vertical force which are components of a pulling force applied by the locking pin. A shim can be installed by passing its hole over the lower end of the locking pin and it is secured in place by the means of a collar that is provided by the locking pin.

12 Claims, 10 Drawing Sheets

CUTTING TOOL WITH LOCKING PIN

CROSS-REFERENCES TO RELATED APPLICATIONS

U.S. Patent Documents

| | | | |
|---|---|---|---|
| 3,280,450 | October, 1966 | Sirola | 29/96 |
| 3,289,272 | December, 1966 | Stier | 29/96 |
| 3,314,126 | April, 1967 | Stier | 29/96 |
| 3,316,616 | May, 1967 | Milewski | 29/96 |
| 3,341,920 | September, 1967 | Kelm | 29/96 |
| 3,341,923 | September, 1967 | Kelm | 29/96 |
| 3,393,435 | July, 1968 | Villet | 29/96 |
| 3,409,964 | November, 1968 | Jessop | 29/96 |
| 3,469,296 | September, 1969 | Reeve | 29/96 |
| 3,488,822 | January, 1970 | Jones | 29/96 |
| 3,491,421 | January, 1970 | Holloway | 29/96 |
| 3,525,136 | August, 1970 | Crosby | 29/96 |
| 3,533,150 | October, 1970 | Welch | 29/96 |
| 3,540,102 | November, 1970 | Yogus | 29/96 |
| 3,579,776 | May, 1971 | Mihic | 29/96 |
| 3,623,201 | November, 1971 | Gustafson | 29/96 |
| 3,654,682 | April, 1972 | Newbould | 29/96 |
| 3,747,179 | July, 1973 | Lovendahl | 29/96 |
| 3,787,941 | January, 1974 | Novkov | 29/96 |
| 3,792,516 | February, 1974 | Mihic | 29/96 |
| 3,807,007 | April, 1974 | Lindskog | 29/96 |
| 3,815,195 | June, 1974 | McCreey | 29/96 |
| 3,854,183 | December, 1974 | Roos | 29/96 |
| 3,906,602 | September, 1975 | Kummer | 29/96 |
| 5,908,255 | September, 1975 | Faber | 29/96 |
| 3,946,473 | March, 1976 | Petersen | 29/96 |
| 3,965,553 | June, 1976 | Faber | 29/96 |
| 3,973,309 | August, 1976 | Kummer | 29/96 |
| 3,997,951 | December, 1976 | Williscraft | 29/96 |
| 4,011,049 | March, 1977 | McCreery | 29/96 |
| 4,044,440 | August, 1977 | Stier | 29/96 |
| 4,204,781 | May, 1980 | Johan | 407/105 |
| 4,244,666 | January, 1981 | Erickson et al. | 407/105 |
| 4,427,322 | January, 1984 | Kroll | 407/105 |
| 4,615,650 | October, 1986 | Hunt | 407/105 |
| 4,632,593 | December, 1986 | Stashco | 403/316 |
| 4,869,624 | September, 1989 | Viellet | 407/104 |
| 4,890,961 | January, 1990 | Carl et al. | 407/105 |
| 5,199,828 | April, 1993 | Forsberg | 407/104 |
| 5,938,377 | August, 1999 | Jordberg | 407/104 |
| 6,155,754 | December, 2000 | Jonsson | 407/103 |
| 6,582,162 B2 | June, 2003 | Shiraiwa | 407/101 |
| 6,599,060 B2 | July, 2003 | Hecht | 407/102 |
| 6,773,210 B2 | August, 2004 | Erickson | 407/102 |

BACKGROUND OF THE INVENTION

The present invention relates to a cutting tool including a tool holder having a recess for receiving a cutting insert and separate means to fasten the cutting insert to the tool holder.

More specifically, the means consists of a locking pin that has a combined tilting and linear movement, being actuated by a locking screw.

A number of solutions are known to secure a cylindrical holed insert in a tool holder using a clamping pin, which presses the insert against the lateral sides of a holders pocket, on a direction parallel with bottom side of the pocket, such as in the U.S. Pat. Nos. 3,280,450; 3,289,272; 3,314,126; 3,409,964; 3,469,269.

In this kind of solutions the stability of insert in its pocket against unwanted lifting is given by the friction between the insert surfaces in contact with the pin or holder. Some of those solutions do not provide the means for shim installing and that makes the insert more vulnerable. While for relatively light machining jobs the above can be acceptable mostly due to some advantages like no restriction for chip flowing and easy exchange of insert, it can not cover heavy-duty machining situation, when big cutting forces combined with vibration may insecure the insert. For such situation a tool construction has been developed when, in addition to the pin an extra clamping device was added which presses the insert from the above, like in U.S. Pat. Nos. 3,837,058; 3,889,332; 4,938,639.

Those solutions give a strong and secure clamping job but with the disadvantages of chip flow obstruction and more difficult insert replacing.

Compromise solutions have been developed when the clamping element is a pin that can apply the clamping force in both horizontal and vertical direction, such in the U.S. Pat. Nos. 3,341,923; 3,908,255; 4,011,049; 4,427,322; 4,615,650; 4,632,593; 4,869,624; 4,890,961; 5,199,828; 6,155,754; 6,582,162; 6,599,060; 6,773,210.

Some of the above solutions are applicable at countersink hole inserts only with the disadvantage that either in some of them the clamping element that is usually a screw has to be removed in order to replace the insert and can be easily lost or in some of them the arrangement is complicated by the additional elastic elements like springs, clips, tubular pins or rubber rings.

BRIEF SUMMARY OF THE INVENTION

In accordance with the present invention there is provided a cutting tool for chip removing and a versatile locking pin for clamping an insert in a tool holder.

The cutting tool comprises of a tool holder, a cutting insert, a locking pin, a screw and a shim. Also embodiment without shim may be considered.

The tool holder includes an insert receiving pocket, a first hole on the base wall of the pocket, which partially surrounds the cylindrical portion of the locking pin, a second through hole positioned next to the insert receiving pocket and a passage providing an opening between the first hole and the second hole.

For arrangement with shim the passage has an enlarged section above the base wall and a narrowed section extending from the top under the base wall.

For arrangement without shim the passage extends from the bottom of the tool holder.

The J shaped locking pin of the cutting tool provides the means to secure the cutting insert into a clamping engagement with the base wall and side walls of the tool holder's pocket, and it has an horizontal arm and a vertical arm.

The horizontal arm has an enlarged portion in a half bushing shape located and trapped by the screw into the second hole of the tool holder, and a reduced portion, housed into the narrowed section of the holder's passage, making the joint between the enlarged portion and the vertical arm.

The vertical arm is partially situated within the first hole of the tool holder and extends through the shim and insert openings, it has a cylindrical portion, a collar provided for arrangement with shim only, and a clamping head.

The clamping head is located at the upper end of the vertical arm of the locking pin and extends through the insert's hole enforcing it against the base wall and side walls of the holder's recess. Different clamping head configurations can be used for different embodiments, but always it is engineered to allow the cutting insert to be removable positioned in its place by passing the insert's hole over.

The locking pin according to the present invention may work as a levering pin, as a pulling pin or as a levering and pulling pin simultaneously.

Defining the locking pin as being levering, pulling or levering-pulling is based on how the clamping forces are exercised on the cutting insert and is decided by what happens into the first hole of the tool holder.

For arrangement where the first hole offers the abutment for the fulcrum point of the locking pin it works as a levering or as a levering and pulling pin, securing the cutting insert due to a simultaneous tilting and downward sliding movement along to the surface of the first hole.

For arrangement where there is no contact between first hole and the locking pin it works as a pulling pin securing the cutting insert due to both horizontal and vertical forces which are components of a pulling force applied by the locking pin.

One object of the present invention is to eliminate disadvantages mentioned under "Background of the invention" section providing a clamping solution for locking the insert in both horizontal and vertical directions using a minimal number of component parts while the chip flow obstruction is minimized. The insert can be released for indexing or replacing without detaching the locking pin, which still securely retains the shim while the pocket is air blown for cleaning.

Another object is to provide a versatile locking pin so that, based on present invention different arrangements of the cutting tools may be designed for either positive or negative inserts, having either cylindrical or countersink style holes. A different clamping head configuration can be assigned to the locking pin to fit a particularly cutting insert style, and different embodiments can be designed, where the locking pin may work as a levering pin, as a pulling pin or as a levering and pulling pin.

More advantages also, can be mentioned:

Greater range manufacturing tolerances for some features is allowed especially for the "pulling" type embodiments.

The locking pin fits a whole range of inserts shapes belonging to the same inscribed circle size, therefore it can be produced in mass quantity at low cost by injection molding or casting.

May be applicable at a large range of cutting tools for turning, milling, drilling, in positive or negative style, with or without shim.

The upward moving of the locking pin releases the inserts grip in case this is still bonded to the pocket.

BRIEF DESCRIPTION OF THE DRAWINGS

FIG. 7A, B, C, D is the same cross-sectional views as in FIG. 3 depicting the way of shim and insert assembling in sequential moments.

DETAILED DESCRIPTION OF THE INVENTION

The object of the invention will appear more clearly from the following detailed description. It should be noted that the terms "horizontal", "vertical", "left", "right", "low" and "up" in the text represent the directions when the insert lies with its bottom surface on a wholly horizontal, planar ground as is depicted in the drawings. The drawings illustrate embodiments of turning tools using ¾" size tool holders and 55 degree diamond shape inserts having ½" of the inscribed circle. However, the invention covers other kinds of machining tools like milling or drilling tools and other shapes of cutting inserts for example triangle, square, round, etc.

The tool holder includes a shank section and a head section, which are angled relative to one another. The term "tool holder" will henceforth refer to the head portion of the tool holder only.

Referring to the drawings FIG. 1 to 4, the cutting tool comprises a tool holder 1, a cutting insert 2, a screw 3 and locking pin 5.

To grant a strong and firm support base for the insert to prevent cracking on heavy duty machining, the arrangement may be provided with a shim 4 interposed between the insert and the tool holder.

The insert 2 has a through cylindrical hole 21 with axis 22.

The shim 4 has a through opening having a bigger diameter section 41 on the upper side, a smaller diameter section 42 on the lower side and a transition surface 43 between the two sections.

The screw 3 that operates the locking pin has a threaded portion 31, two cylindrical portions 32 and 33 that bear against the unthreaded portion 133 (see FIG. 3) of the tool holder's second hole 13, a reduced diameter cylindrical portion 34 that cooperates with the surface 56 (see FIGS. 4 and 6) of the locking pin, a flat surface 35 that bears against upper surface 53 of the horizontal arm of the locking pin into the clamping process, a flat surface 36 that bears against the lower surface 54 of the horizontal arm of the locking pin (see FIGS. 3 and 5) into the unclamping and lifting process, and a socket 37 (each can be in the both ends of the screw) adapted to receive a suitable tool like an Allen wrench for rotating the locking screw.

The tool holder 1 is provided with an insert and shim-receiving pocket 11, a first hole 12 on the base wall of the recess, a second through hole 13 positioned next to the insert receiving pocket and a passage 14 that extends from the first hole 12 to the second hole 13.

The insert and shim-receiving recess 11 includes a base abutment wall 111 for supporting the base surface of the cutting insert or shim and at least one sidewall 112 for receiving the side of the cutting insert.

Figure 1:
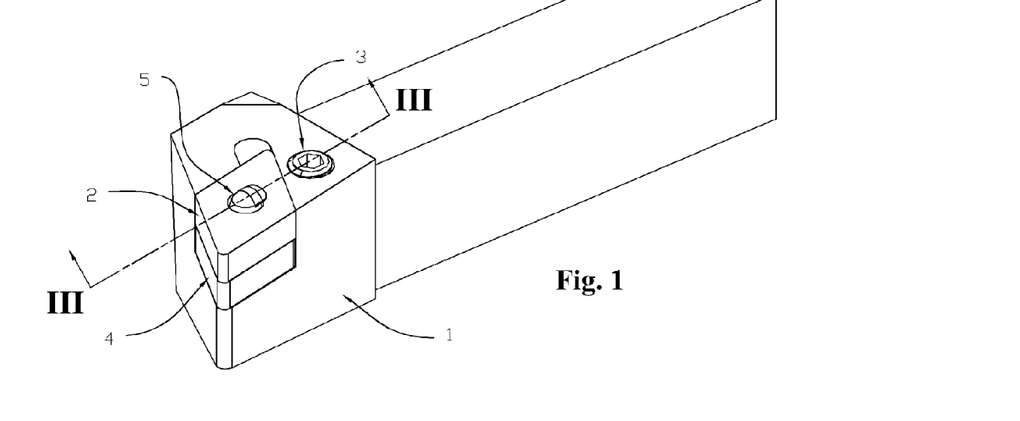
FIG. 1 is a perspective view of a cutting tool according with this invention depicting an embodiment using a negative rack and no countersink hole insert type in fully clamped state.
Figure 2:
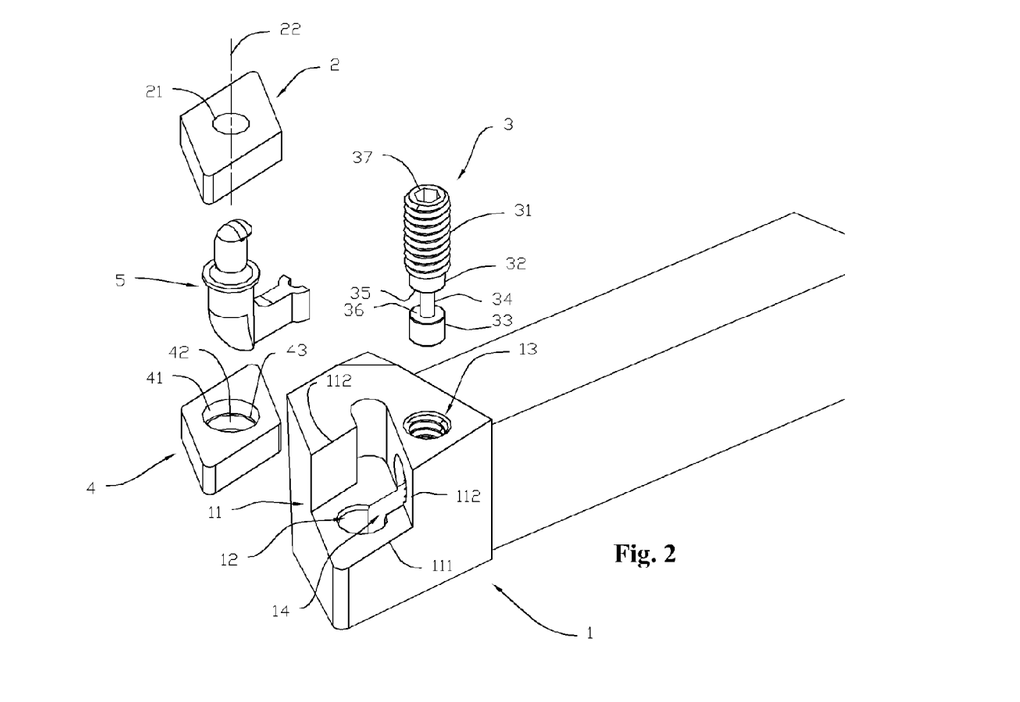
FIG. 2 is a perspective exploded view of the cutting tool FIG. 1.
Figures 3, 4:
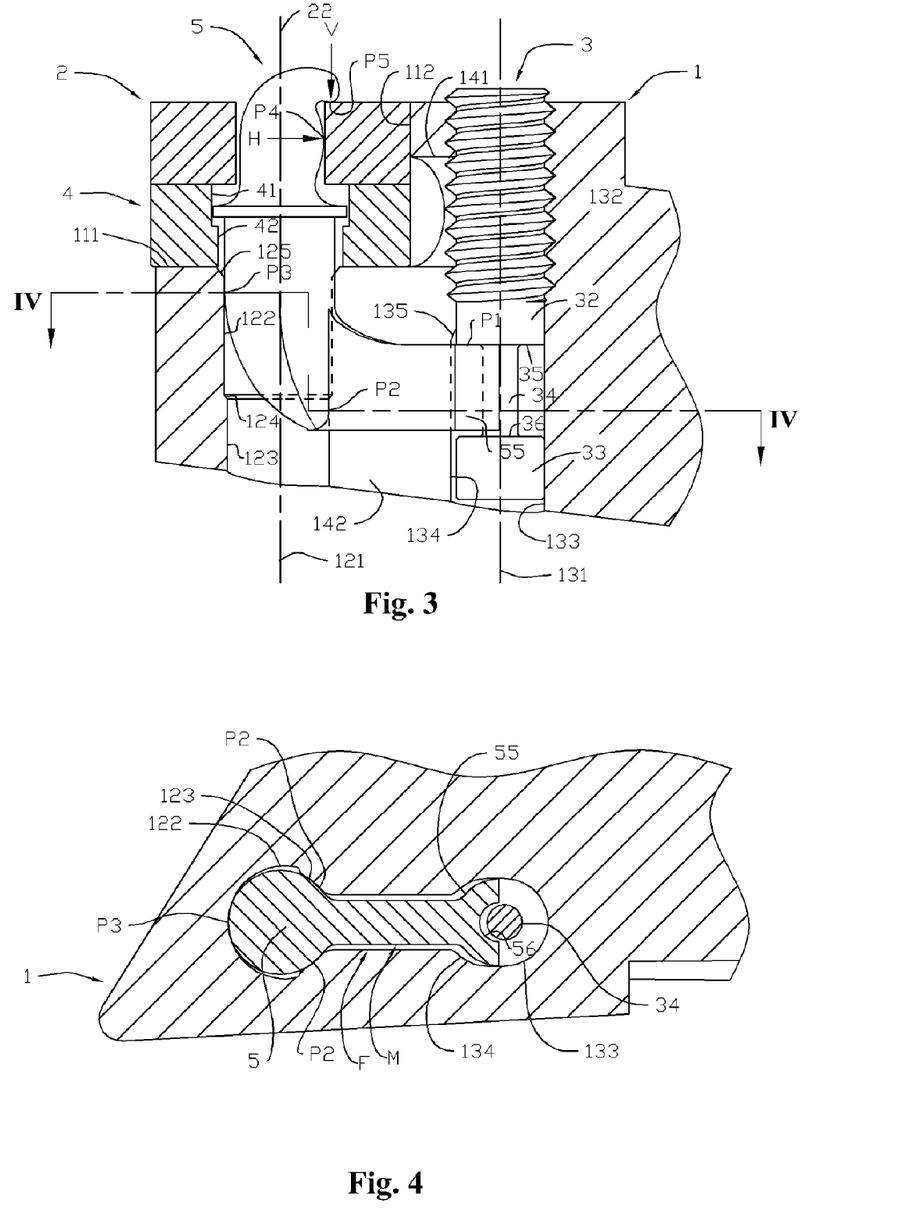
FIG. 3 is a sectional view along line III-III of FIG. 1 with a plane containing the center axis of the holes 12 and 13 of FIG. 2.
FIG. 4 is a cross sectional view along IV-IV line of FIG. 3.
Figure 5:
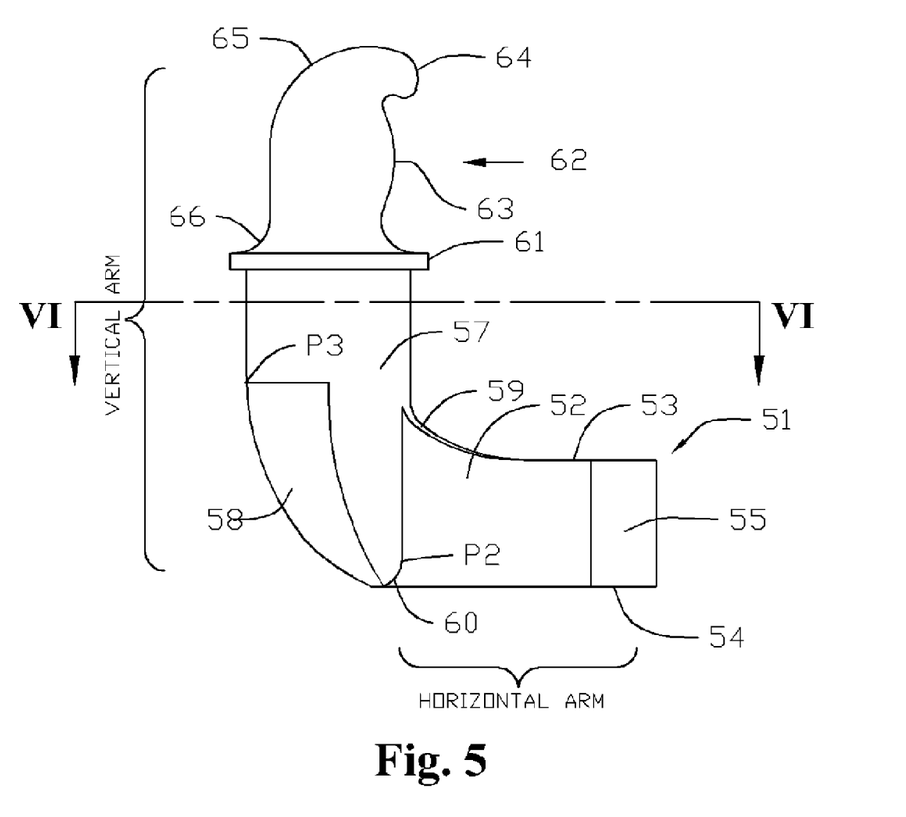
FIG. 5 is the locking pin used in embodiment FIG. 1 to FIG. 4.

The first hole 12 extending normal to the base wall 111 partially surrounds the cylindrical portion 57 of the locking pin shown in FIG. 5, and has the central axis 121 as shown in FIG. 3. Hole 12 has a larger section 122 for supplying the abutment for the fulcrum point P3 of the locking pin, a smaller section 123 that may provide the abutment for the contact point P2 of the locking pin and a tapered surface 124 making a smooth transition between the larger and smaller sections providing on the right side a temporary abutting point for the locking pin in its translation motion imposed by the screw.

Also, the first hole 12 has at the upper side a chamfer or radius 125 for a smooth cooperation with the locking pin.

In this embodiment the axis 121 of the hole 12 is identical with the axis 22 of the insert as shown in FIG. 3.

Figure 10:
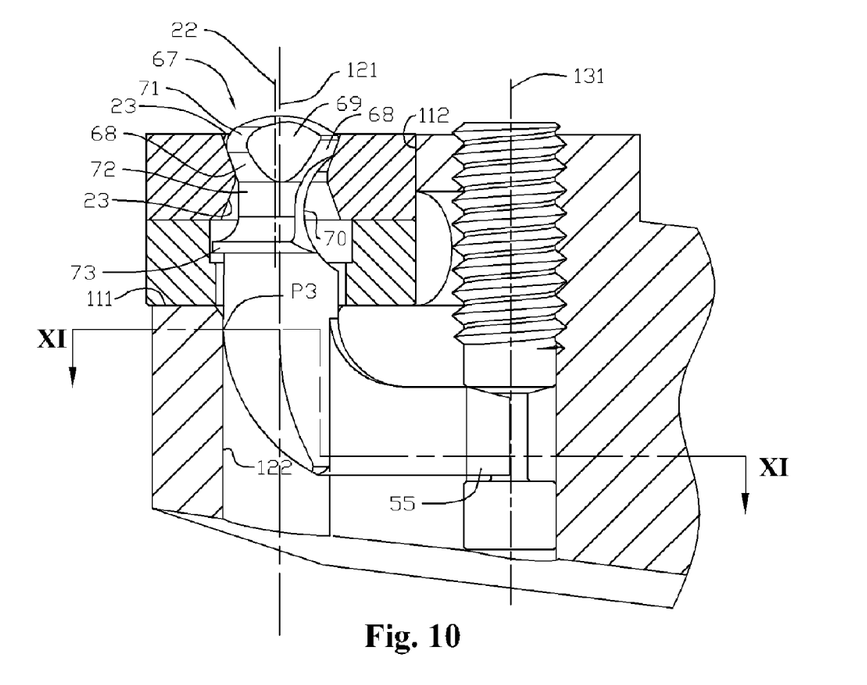
FIG. 10 depicts a clamping solution for a negative double side countersink hole insert using a flipped foot shape clamping head locking pin.

However, different embodiments where the two axes are offset can be considered as shown in FIG. 10.

The diameter of the larger section 122 is slightly larger than the cylindrical section 57 of the locking pin.

The smaller section 123 is recommended for providing a fraction of the horizontal clamping force H for embodiments using cylindrical hole inserts and also for avoiding the self-holding of the locking pin during the unclamping process.

However, embodiments with one section hole only may be considered for alternative arrangements as is shown in FIG. 10 to 18.

The second through hole 13 is positioned next to the insert receiving recess 11 and has the central axis 131 coplanar with axis 121 of the first hole 12. The hole 13 has at the upper side a threaded section 132 and at the lower side a cylindrical section 133.

The diameter of the cylindrical section 133 is slightly smaller than the minor diameter of the thread from the threaded portion and the diameter of the cylindrical portion of the screw are dimensioned accordingly.

To offer clearance for surfaces 55 of the locking pin while it pivots around point P3, the cylindrical portion 133 of the hole 13 has in the lower left side a lateral extension 134. The lateral extension 134 is blended at the upper side with the surface 133 by sloped surface 135.

The passage 14 has an enlarged section 141 on the upper side above the base wall 111 providing an opening between the insert receiving recess 11 and the second hole 13, and a narrowed section 142 under the base wall 111 providing an opening between the first hole 12 and the second hole 13.

The enlarged section 141 that can be a cylindrical hole is to allow the half bushing shaped end 51 of the locking pin to pass through.

The narrow section 142 is to contain and guide the reduced section 52 of the locking pin.

The drawings in the present specification depict embodiments with a through first hole 12, a through second hole 13 and a through passage 14; this makes sense for a ¾" size tool holder. However, these may not be through for bigger tool holders.

Figure 6:
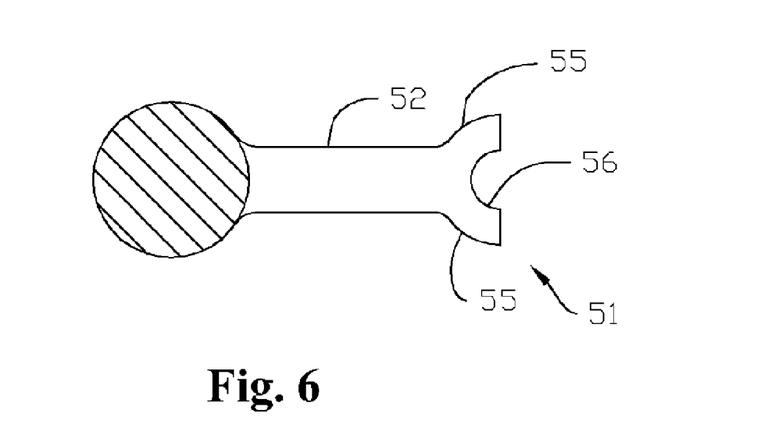
FIG. 6 is a cross sectional view along VI-VI line of FIG. 5.

A mainly "J" shaped locking pin 5 shown in more detail in FIGS. 5 and 6, secures the cutting insert into a clamping engagement with the base wall and side walls of the tool holder's recess 11.

The locking pin has a horizontal arm and a vertical arm.

The horizontal arm has at the right end an enlarged portion 51 in a half bushing shape located and trapped by the screw into the unthreaded portion 133 of the second hole of the tool holder, which retains and guides the locking pin while it is freely moved up or down in a mainly translation motion by the action of the screw.

This half bushing end has two external surfaces 55 that cooperate with the cylindrical section 133 of the second hole 13 of the tool holder and an internal surface 56 that cooperates with the reduced diameter 34 of the screw.

The horizontal arm also features a reduced portion 52 housed into the narrowed section 142 of the tool holders' passage 14. The reduced portion 52 joins the half bushing shape end 51 and the cylindrical portion 57 of the locking pin. Both portions 51 and 52 of the horizontal arm are bordered at the upper side by the surface 53 and at the lower side by the surface 54.

The vertical arm is partially located within the first hole 12 of the tool holder and extends through the shim and insert openings. It has a cylindrical portion 57, a collar 61, and a clamping head 62.

The cylindrical portion 57 that extends through the first hole 12 of the tool holder and the smaller diameter portion 42 of the shim opening is discontinued on the left lower side by a rounded surface 58 that merges with the bottom surface 54 of the horizontal arm. The rounded surface 58 is to facilitate the installation of the shim and is also created to develop the contact fulcrum point P3 for the locking pin, slideable along the surface 122 of the tool holder.

On the right side the cylindrical surface 57 of the vertical arm joins the top bordering surface 53 of the horizontal arm under a filleted strengthening portion 59.

At the lowest right end the cylindrical surface 57 is rounded on both sides of the horizontal arm to offer two small filleted surfaces 60. These two surfaces have the purpose to grant a smooth contact for slidable contact points P2 of the locking pin with the surfaces 124 and 123 of the tool holder.

Figure 7:
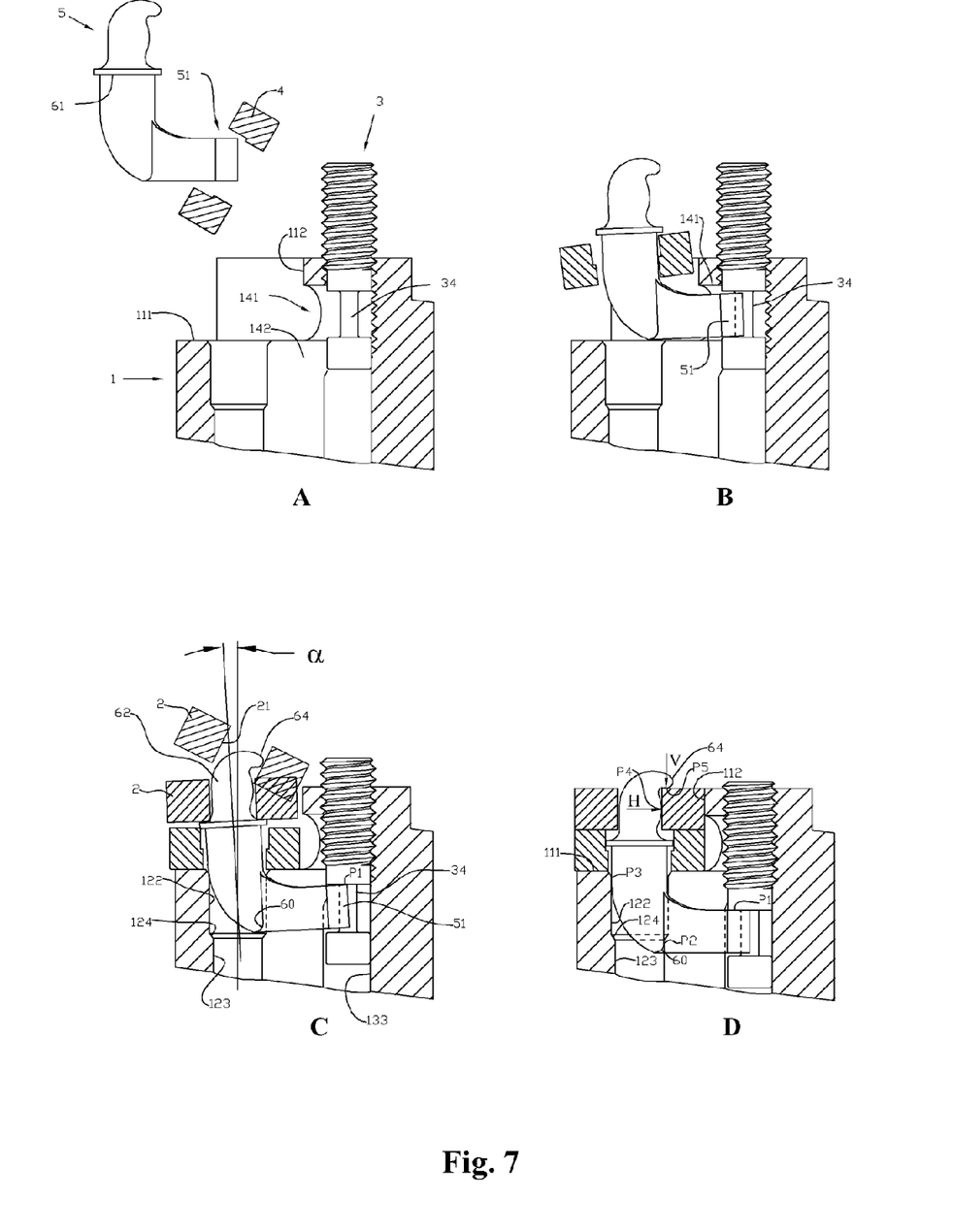

The locking pin is dimensioned such that the smallest diameter of the shim hole is larger than any sequential cross-section of both the horizontal arm and the cylindrical portion of the vertical arm and thereby enable the shim to be removable positioned in its place as shown in FIGS. 7A and B.

The collar 61 located at the upper end of the cylindrical section 57, is contained into the bigger portion 41 of the shim opening and its diameter is bigger than the smaller portion 42 of shim opening. The collar has the purpose to retain the shim while the insert is taken apart for indexing or replacing and the pocket is air-blown for cleaning.

In addition, the collar may help to loosen the inserts' grip at the unclamping process in case the insert is still bonded in place. A notch that may interrupt the collar (see FIG. 10 feature 70) can always be a solution in order to facilitate installation and removal of the insert.

The clamping head 62 is located at the upper end of the vertical arm of the locking pin and extends through the insert's hole enforcing it against the base wall and side walls of the holder's recess.

In any embodiment of this invention the clamping head is designed according with the insert hole style and clamping solution adopted, and it is always engineered to allow the cutting insert to be removable positioned in its place by passing the insert's hole over the clamping head as shown in FIG. 7C. Therefore, during the installation the biggest sequential cross-section of the clamping head must be smaller than the smallest section of the insert's hole.

For the arrangement described so far using a negative insert with the cylindrical hole, the clamping head 62 comprises a barrel section 63 that engages the bore of the insert urging it on a horizontal direction H against the lateral sides 112 of the holder insert's receiving recess. In addition, the clamping head features an offset projection 64, extending laterally over the upper surface of the cutting insert for the purpose of engaging it in a vertical direction V against the bottom wall 111 of the insert receiving recess. The clamping head also features a rounded portion 65 on the opposite side of the offset projection 64 to facilitate the installation and removal of the insert and a fillet surface 66 to add mechanical strength. All of the clamping head's features are integrated and smoothly rounded together.

The function and operation of the cutting tool

As shown in FIG. 4, in a cross section the tool holder 1 has a female profile opening F containing the male profile M of the locking pin 5. Also, the half bushing end of the locking pin is trapped by the locking pin into the unthreaded portion of the second hole of the tool holder.

The interrelated assembly of the female profile of the tool holder and the male profile of the locking pin is dimensioned so that the tool holder contains, retains and guides the locking pin.

The locking pin can be drawn up or down in a mainly translation motion by the action of the screw in any intermediate position between the extreme upper position FIG. 7B when the initial assembling or shim replacement can be performed, and the extreme lower position FIG. 7D when the locking pin is firmly engaged in the clamping job.

As depicted in FIG. 7A, for initial assembling the screw 3 is inserted about two to three threads into the holder 1, for a rough alignment of its reduced diameter 34 with the enlarged section 141 of the tool holders' passageway.

Separately, the half bushing end 51 of the locking pin 5 is drawn into the shim's hole until it stops in the collar 61.

The end 51 of the locking pin is introduced through the enlarged passage section 141 of the tool holder to meet the reduced diameter 34 of the screw, as shown in FIG. 7B.

After the first rotation of the screw the half bushing of the locking pin is trapped into the second hole of the tool holder and the locking pin cannot fall down anymore. After the screw is rotated a few more turns the insert's hole 21 is drawn over the clamping head 62 of the locking pin, as shown in FIG. 7C. A left tilting of the locking pin under the angle a of 2-3 degrees will offer more room for insert loading. The left tilting is due to a predetermined clearance between the half bushing shape end 51 of the locking pin, the cylindrical portion 133 of the second hole of the tool holder and the reduced portion 34 of the screw.

Once the insert 2 is roughly seated as shown in FIG. 7C, two to three more rotations of the screw are necessary to have the insert fully clamped as shown in FIG. 7D.

During this phase the locking pin is drawn downward with no restriction until the rounded surfaces 60 of the locking pin reaches the holders' abutting tapered surface 124 on the movable contact points P2.

Due to the pressure that the screw exercises in contact point P1, the tiny rounded surfaces 60 of the locking pin slides against the transitional tapered surface 124 of the tool holder to pass over it and the movable contact point P2 to reach the cylindrical abutting surface 123. Therefore, the lower side of the locking pin is pushed towards the left, and fulcrum point P3 is pushed against the portion 122 of the first tool holder's first hole. The locking pin is forced to pivot around its fulcrum point P3 by a tilting movement and its barrel section of the clamping head pushes the insert in point P4 toward right against the sidewalls of the insert receiving pocket (FIG. 7D).

When the rounded surfaces 60 of the locking pin reaches the surface 123 of the tool holder in the contact point P2, a fraction of the horizontal clamping force H is achieved, forcing the insert to seat firmly against the sidewalls of the insert receiving pocket before the final horizontal and vertical clamping forces will be achieved. However, the locking pin and its contact points P2, P3 and P4 continue to slide downward as the locking pin is drawn by the screw until the offset projection 64 of the locking pin contacts the upper face of the insert in point P5. Then, the vertical sliding stops and a reasonably increasing Allen key torque will develop the vertical clamping force V against the surface 111, and will increase the horizontal clamping force H at the desired level.

The number of screw revolutions for each phase is not in very close tolerance; however it should be a predetermined number that depends on both the screw pitch and the real dimensions of the parts involved.

When the insert is fully clamped, a number of forces (five for the embodiment already described) are applied to the locking pin, one in each of the locking pin's contact points. These forces, belonging to a statically determined force system, may reversibly bend the pin. The bending can be easily controlled because it is related to the locking pin and tool holder's geometry and material, it should be into the very beginning of the elastic zone of the strain-stress diagram of locking pin material. Some elasticity of the locking pin is favorable for some of the clamping solutions of this invention because it will allow the fulcrum point P2 of the locking pin to pass smoothly over the transitional abutting tapered surface 124 of the tool holders' first hole, and may also allow the increase of fabrication tolerance.

For the arrangement shown in FIG. 1 to 4, the locking pin works both as a levering and as a pulling pin. The locking pin has levering action because the tool holder offers an abutting surface 112 for the fulcrum point P3 of the locking pin that gives it a tilting movement, urging the insert mainly in a horizontal direction. The locking pin also serves to pull because the fulcrum point P3 is a sliding point allowing a downward movement of the locking pin that stops when the offset projection 64 of the locking pin reaches the upper side of the insert in the contact point P5, urging the insert in a vertical direction.

There are more options in developing the idea of this invention, depending on the insert style or how the locking pin exercises pressure on the cutting insert.

Using different insert hole styles and/or changing the locking pin contact points, different embodiments can be developed wherein the locking pin may work as a levering and pulling pin, as a levering pin only or as a pulling pin only.

To emphasize the fact that this invention may cover a wide range of cutting tool arrangements, more alternative embodiments will be described in the following paragraphs. They are for illustrative purposes, and are by no means intended to limit application. For the similar structural and/or functional features, reference numbers have been assigned which correspond to the reference numbers of FIG. 1 to FIG. 6.

Figure 8:
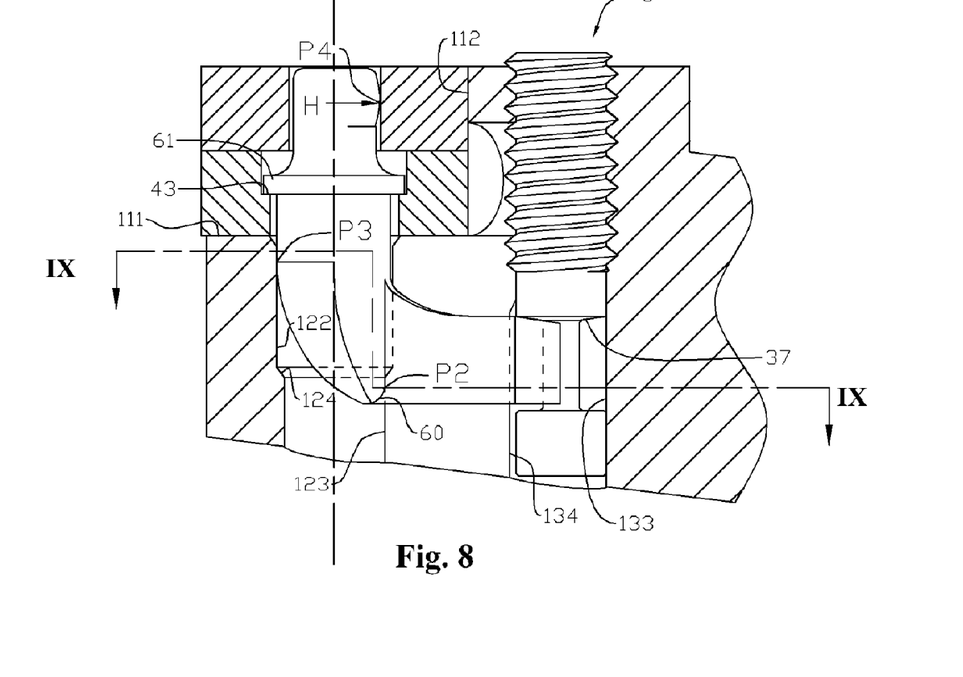
FIG. 8 depicts a simplified embodiment of FIG. 3 for a negative rack and no countersink hole insert type.
Figure 9:
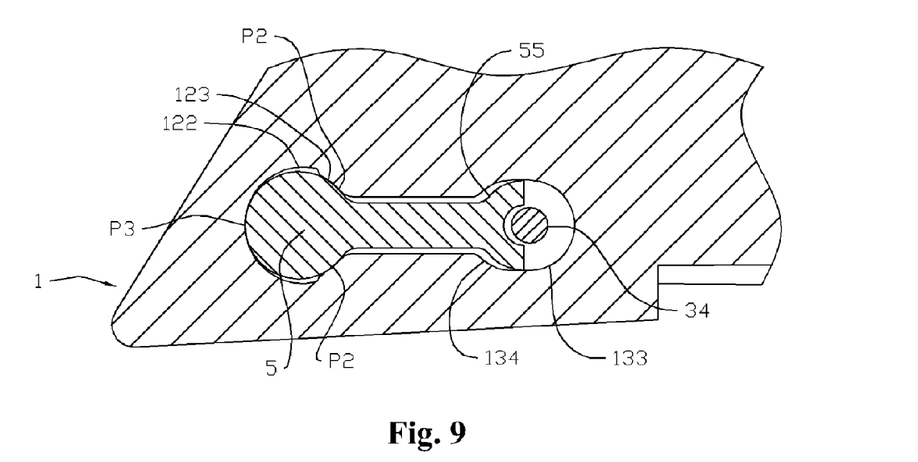
FIG. 9 is a cross sectional view along IX-IX line of FIG. 8.

FIGS. 8 and 9 depict an alternative simplified embodiment of the one described earlier, in which the offset projection 64 of FIG. 5 is not provided for the clamping head of the locking pin.

The clamping process occurs in the same way as in the previous embodiment described, except that since the offset projection 64 of the locking pin is missing, its downward movement will stop at the moment when the collar 61 contacts the shim's surface 43. A slim increase of the screw's torque will force the shim against the bottom wall 111 of the tool holder's recess, while the levering tendency of the locking pin increases the horizontal clamping force H.

The contact surfaces between the locking pin's collar and the shim should be engineered to accommodate each other.

The flat surface 35 of the screw used on the previous embodiment (see FIG. 3) has been replaced here with a taper surface 37, and the surface 53 of the horizontal end of the locking pin (see FIG. 5) has been modified consequently.

However, an optional taper surface 37 can be applied to any embodiment according with this invention in order to achieve an optimal distribution of horizontal and vertical clamping forces.

The locking pin works in this embodiment as a levering pin, forcing the insert in the horizontal direction; the insert is secured on the vertical direction by the friction forces only.

A downward friction force in contact point P4 due to the downward movement of the locking pin determines a better seating of the insert and shim compared with prior arts.

Figure 11:
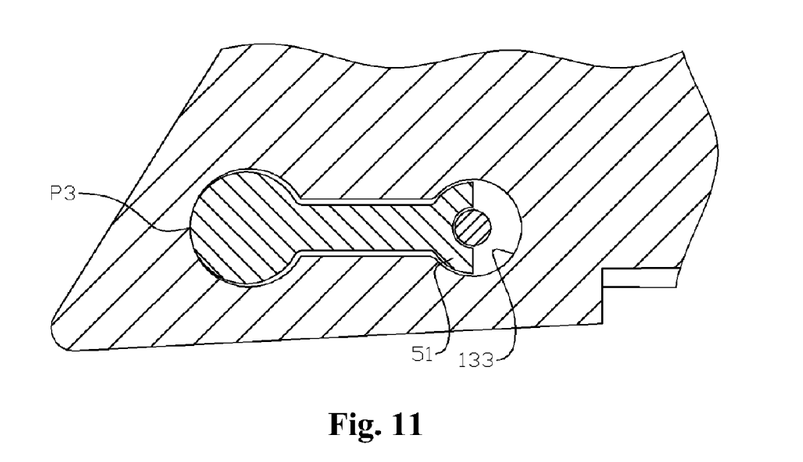
FIG. 11 is a sectional view along XI-XI line of FIG. 10.

FIGS. 10 and 11 show a clamping solution for a negative rack double side countersink hole insert.

The clamping head 67 of the locking pin used for this embodiment has a different configuration; it has roughly a flipped foot shape, having a frustum of cone portion 68 and a neck portion 72.

To make possible installing and removing the insert over the clamping head some modifications have been performed at the frustum of cone 68. Two slices have been removed from the lateral opposite sides of the outer periphery, providing two chamfers 69. Also, a notch 70 is provided in the side toward the horizontal arm, and a rounded fillet surface 71 in the opposite side of the notch. All the surfaces of the clamping head are smoothly rounded and blended together.

The two undisturbed surfaces 68 of the initial frustum of cone providing the contact points with the countersink abutting surface of the cutting insert's hole are orientated in alignment with the horizontal arm of the locking pin.

The notch 70 that may interrupt both the neck 72 and the collar 73 is to facilitate installing and removing the insert and to grant the locking pin more elasticity.

Some additional modifications have been performed at the tool holder. The smaller portion 123 of the first hole from FIG. 3 has been eliminated. Also, the lateral extension 134 of FIG. 3 has been eliminated and replaced with some clearance between the cylindrical section 133 of the second tool holder's hole and the half bushing end 51 of the locking pin to provide enough clearance for the left movement of the locking pin, as shown in FIG. 11.

The central axis 121 of the tool holder's first hole and the central axis 22 of the insert hole are slightly offset relative to each other in order to improve the clamping in the horizontal direction.

The downward movement of the locking pin stops when its surfaces 68 contact on both right and left sides the taper surfaces 23 of the insert's hole, urging the insert in a vertical direction. The fulcrum point of the locking pin contacts the abutting surface 122 of the tool holder in contact point P3, giving the locking pin a tilting movement tendency. This tilting movement combined with the effect imposed by the offset axis 22 and 121 urges the insert in a horizontal direction; the locking pin works as a levering and pulling pin.

The countersink portion of the insert's hole for this or any other embodiment in accordance with this invention is not to be limited to the shape that the drawings suggest, but is meant to include any other countersink configuration.

Figure 12:
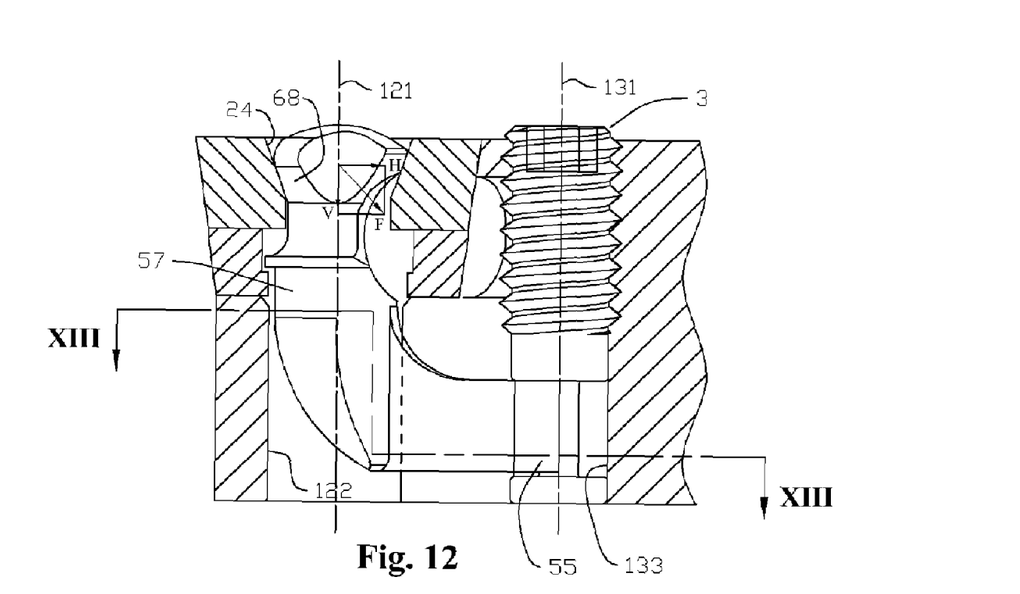
FIG. 12 depicts a clamping solution for a positive insert with countersink hole, using a flipped foot shape clamping head locking pin.
Figure 13:
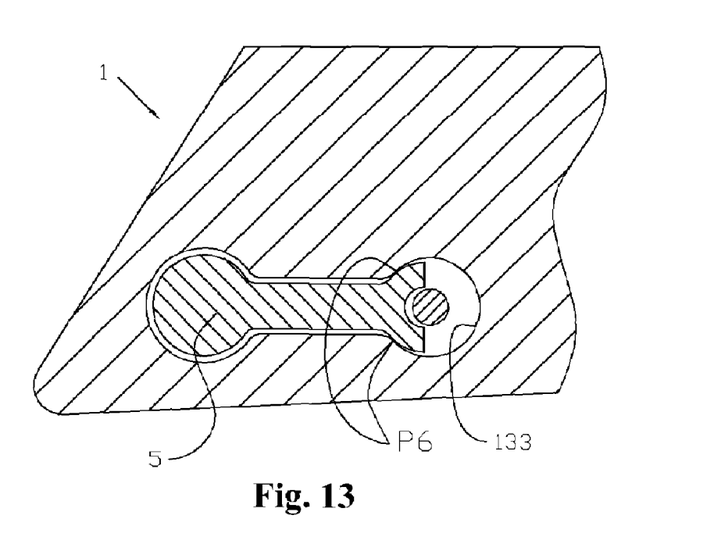
FIG. 13 is a sectional view along XIII-XIII line of FIG. 12.

FIGS. 12 and 13 show a clamping solution for a positive insert using mainly the same locking pin configuration shown in FIG. 10. However, beside the obvious modification made to the apparatus to accommodate a positive rack insert, some further modifications have been performed.

Unlike the embodiment shown in FIG. 10, in the embodiment shown in FIG. 12 the surface 122 of the first hole does not provide the abutment for the locking pin; instead a bigger clearance is provided between cylindrical portion 57 of the locking pin and cylindrical surface 122 of the tool holder's first hole.

The downward movement of the locking pin stops when its surfaces 68 contact the taper surfaces 24 of the insert's hole in both right and left sides.

Since there is no contact between the locking pin and the surface 122 of the tool holder there will be no levering effect imposed by the locking pin to the cutting insert, but only a direct tension force.

A horizontal force H and a vertical force V are components of the direct tension force F applied by the locking pin and will act simultaneously, thereby securely retaining the cutting insert into its pocket against the base wall and side walls.

The surface 133 of the second hole becomes the contact-abutting surface for the surface 55 of the locking pin in the sliding contact points P6 as shown in FIG. 13.

A light modification made for the tool holder yields a different clamping solution.

The locking pin works only as a pulling pin in this embodiment.

Figure 14:
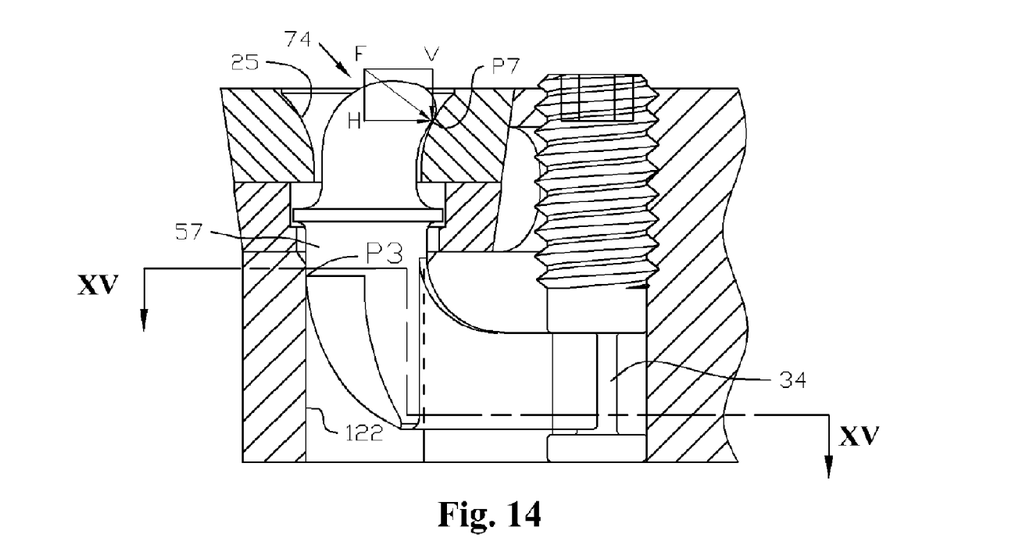
FIG. 14 depicts a clamping solution for a positive insert with countersink hole, using a finger shape clamping head locking pin.
Figure 15:
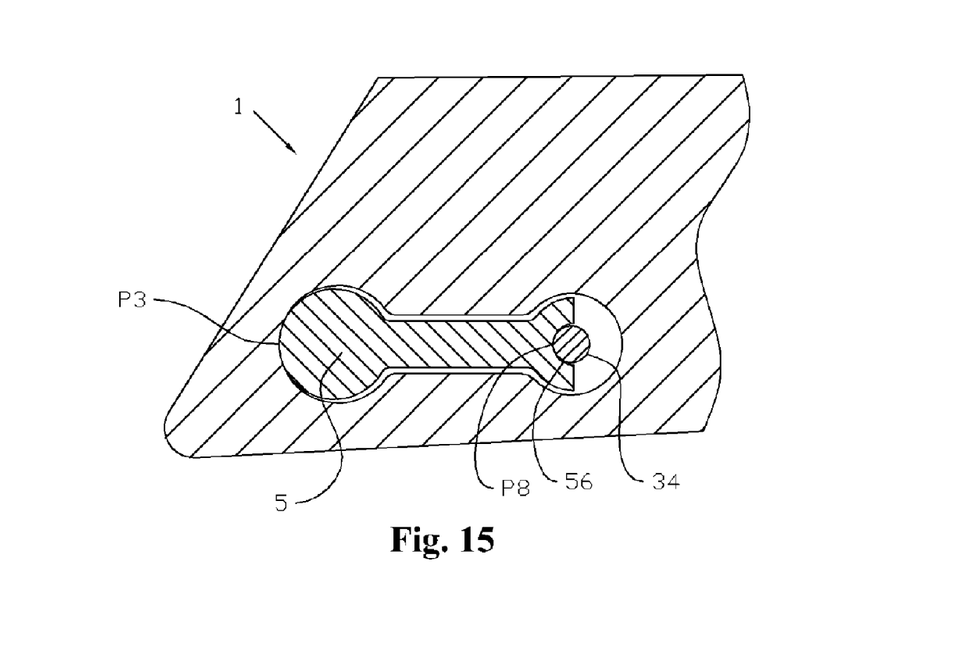
FIG. 15 is a sectional view along XV-XV line of FIG. 14.

FIGS. 14 and 15 illustrate an alternate clamping solution for a positive countersink hole insert using a locking pin having a different clamping head configuration.

The clamping head 74 of the locking pin has a finger shape leaning toward the horizontal arm and extending through the insert's hole.

On this embodiment between cylindrical portion 57 of the locking pin and cylindrical surface 122 of the tool holder's first hole it is provided a very small clearance in order to offer a contact point P3 for the locking pin in the first tool holder's hole.

At the moment when the clamping head 74 of the locking pin contacts the countersink hole of the cutting insert in the point P7, the locking pin will work as a lever, pushing the insert with the force F normal to the insert hole profile in the contact point P7.

A horizontal force H and a vertical force V are components of the force F which act simultaneously, thereby securely retaining the cutting insert into its pocket against the base wall and side walls.

Due to a different system force distribution, the surface 34 of the screw may became a contact-abutting surface for the surface 56 of the locking pin in contact point P8 as shown in FIG. 15.

The locking pin works only as a levering pin in this arrangement.

Figures 16, 18:
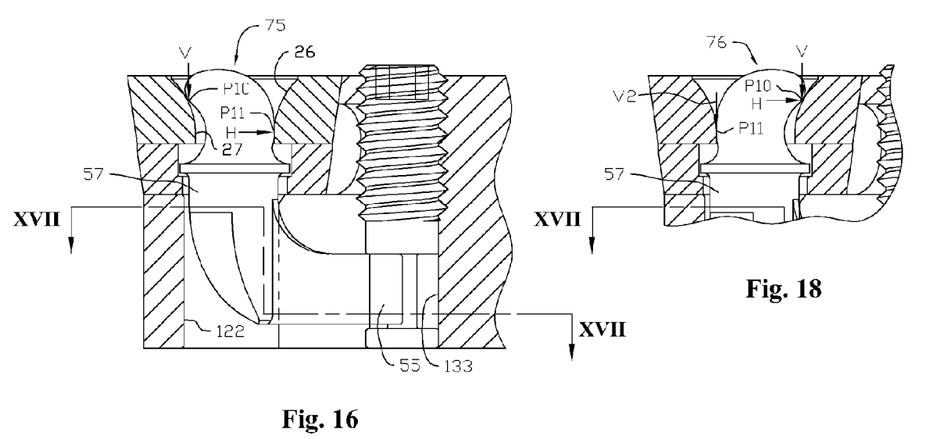
FIGS. 16 and 18 depict two other clamping solutions for a positive insert with countersink hole, using a finger shape clamping head locking pin
Figure 17:
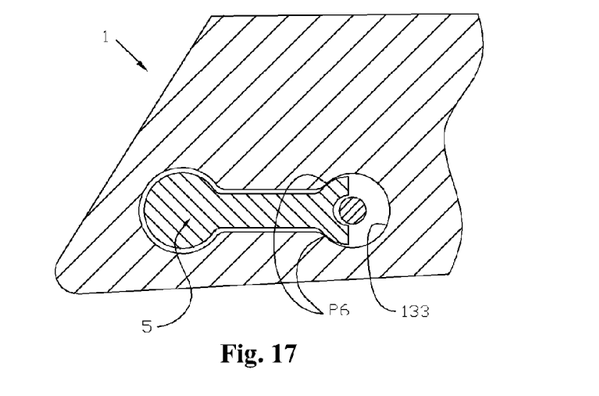
FIG. 17 is a sectional view along XVII-XVII line of FIGS. 16 and 18.

FIG. 16 to 18 illustrate two different clamping solutions for a positive countersink hole insert using a finger-type clamping head locking pin.

The insert's hole has a countersink portion 26 and a cylindrical portion 27.

Unlike the previous arrangement shown in FIGS. 14 and 15 where a levering point is provided for the locking pin, on these arrangements a bigger clearance is provided between cylindrical portion 57 of the locking pin and cylindrical surface 122 of the tool holder's first hole, resulting in no contact levering point between these two cylindrical parts.

The clamping will be performed at the moment when the clamping head of the locking pin contacts the cutting insert's hole in two opposite side points P10 and P11.

For the arrangement shown in FIG. 16 the clamping head 75 of the locking pin has a finger shape leaning away from the horizontal arm of the locking pin. At the clamping process the first locking pin contact point P10 in the countersink portion of the insert' hole exerts a locking pressure V in a vertical direction against the countersink portion 26 of the cutting insert bore. The second locking pin contact point P11 in the cylindrical portion of the insert's hole exerts a locking pressure H in a horizontal direction against the cylindrical portion 27 of the cutting insert bore.

For the arrangement shown in FIG. 18, the clamping head 76 of the locking pin has a finger shape leaning toward the horizontal arm of the locking pin. At the clamping process both the horizontal and vertical clamping forces are exercised in contact point P10 while in point P11 a positive downward directed frictional force V2 is exercised.

For both arrangements in FIGS. 16 and 18 the surface 133 of the second hole is the contact abutting surface for the surface 55 of the locking pin in sliding contact points P6 as shown in FIG. 17.

The locking pin works only as a pulling pin in both arrangements.

Figure 19:
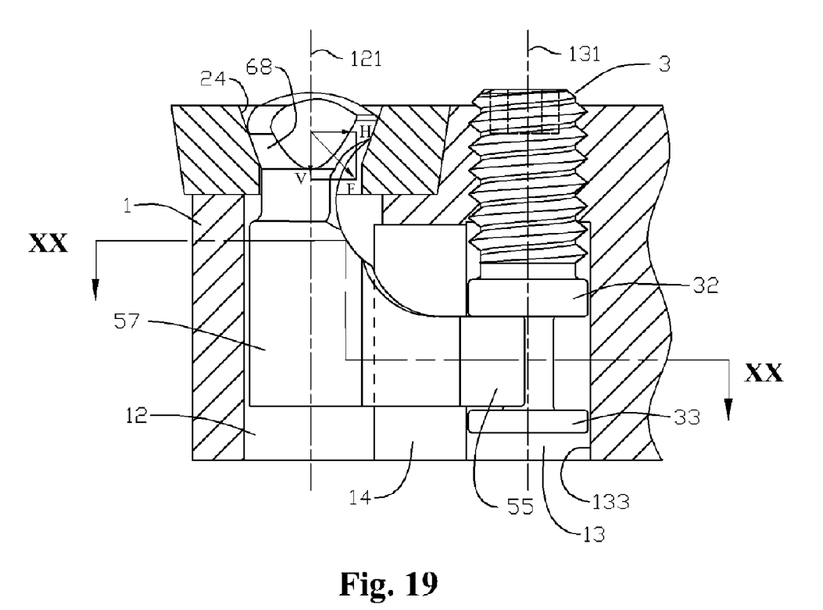
FIG. 19 depicts a clamping solution without shim for a positive insert with countersink hole, using a flipped foot shape clamping head locking pin.
Figure 20:
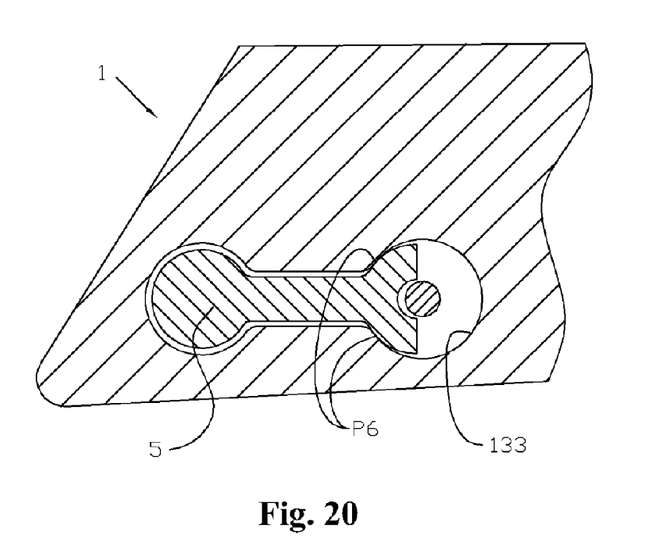
FIG. 20 is a sectional view along XX-XX line of FIG. 19.

FIGS. 19 and 20 depicts a modified embodiment described related to FIG. 12, using the same clamping head configuration for the locking pin, but without shim.

Because the shim was eliminated, and also, because the locking pin is a pulling type—therefore no fulcrum point required, the cylindrical portion 57 of the locking pin is not rounded anymore. Also, because no shim, no collar.

The passage 14 of the tool holder 1 has only the narrowed section extending from the bottom of the tool holder at a depth according to the desired locking pin travel, providing an opening between the first hole 12 and the second hole 13.

The diameter of the cylindrical section 133 of the second hole 13 of the tool holder 1 is slightly bigger than the major diameter of the threaded portion of the screw; the diameter of the cylindrical portions 32 and 33 of the screw and the size of the external surface 55 of the half bushing end of the locking pin are dimensioned consequently.

Both the locking pin and the screw are initially installed from the bottom of the tool holder.

The surface 133 of the second hole is the contact abutting surface for the surface 55 of the locking pin in sliding contact points P6 as shown in FIG. 19.

Arrangements without a shim may also be considered for other clamping head configurations described and especially for the embodiments using positive inserts. No shim option may be preferred for light duty or smaller size tools and for internal turning bars where space is limited.

All of the embodiments which have been described in this specification are only several examples which can utilize this invention and are intended to be for illustration but not for limitation.

What is claimed is:

1. A cutting tool securing a cutting insert and a shim by the action of a screw, comprising:
   a tool holder having an opening that includes:
      a pocket that has a base wall and at least one side wall for receiving the insert,
      a first hole on the base wall of the pocket,
      a second hole, positioned next to the pocket, containing the screw, and
      a passage, having
         an enlarged section above the base wall providing an opening between the pocket and the second hole, and
         a narrowed section under the base wall providing an opening between the first hole and the second hole, and
   a locking pin disposed to secure the cutting insert including:
      a horizontal arm having
         an enlarged portion in a half bushing shape located and trapped by the screw into the second hole of the tool holder, and
         a reduced portion, housed into the narrowed section of the holder's passage, making the joint between the enlarged portion and the vertical arm,
      a vertical arm aligned with the tool holder's first hole, having:.
         a cylindrical portion rounded at the left lower side to enable the shim to be positioned in its place by passing the shim's hole over
         two small rounded surfaces disposed on both sides of horizontal arm,
         a collar to retain the shim, and
         a clamping head,
      wherein the locking pin is mainly J-shaped and is located into the tool holder's opening which is dimensioned such that the tool holder contains, retains and guides the locking pin as it is drawn down or up in a mainly translation motion by the action of the screw.

2. A cutting tool according to claim 1
wherein the first hole of the tool holder has
   a larger section,
   a smaller section, and
   a tapered section making a smooth transition between the larger and smaller sections,
and wherein the locking pin secures the cutting insert due to a simultaneous tilting and downward sliding movement along to the first hole.

3. A cutting tool according to claim 1
wherein the first hole of the tool holder is one diameter hole,
and wherein the locking pin secures the cutting insert due to a simultaneous tilting and downward sliding movement along to the surface of the first hole.

4. A cutting tool according to claim 1
wherein the first hole of the tool holder is one diameter hole offering a big enough clearance to avoid the contact with the locking pin,
and wherein the locking pin secures the cutting insert due to both a horizontal and a vertical force which are components of a pulling force applied by the locking pin.

5. A cutting tool with locking pin securing a cutting insert and a shim by the action of a screw, comprising:
a tool holder having an opening which includes:
  a pocket that has a base wall and at least one side wall for receiving the insert,
  a first hole on the base wall of the pocket,
  a second hole, positioned next to the pocket, containing the screw, and
  a passage, that has
    an enlarged section above the base wall providing an opening between the insert receiving pocket and the second hole, and
    a narrowed section under the base wall providing an opening between the first hole and the second hole;
and a J-shaped locking pin located into the tool holder's opening including:
  a horizontal arm having
    an enlarged portion in a half bushing shape located and trapped by the screw into the second hole of the tool holder, and
    a reduced portion, housed into the narrowed section of the holder's passage, making the joint between the enlarged portion and the vertical arm;
  a vertical arm partially disposed within and aligned with the tool holder's first hole, said vertical arm having
    a cylindrical portion rounded at the left lower side, dimensioned to enable the shim to be positioned in its place by passing the shim's hole over over
    two small rounded surfaces disposed on both sides of horizontal arm,
    a collar retaining the shim while the cutting insert is removed, and
    a clamping head extending through the insert's hole, dimensioned to enable the insert to be positioned in its place by passing the insert's hole over
wherein the locking pin is disposed to secure the cutting insert in both horizontal and vertical direction into a clamping engagement with the base wall and the side walls of the tool holder's pocket either due to a simultaneous tilting and downward sliding movement along to the surface of the first hole, or due to both a horizontal and a vertical force which are components of a pulling force applied by the locking pin.

6. A locking pin according to claim 5
wherein the clamping head extending through a cylindrical hole type insert include:
  a barrel section that engages the bore of the insert urging it on a horizontal direction against the lateral sides of the holder insert recess,
  an offset projection extending laterally toward the horizontal arm of the locking pin over the upper surface of the cutting insert for engaging it in a vertical direction against the bottom insert pocket of the tool holder, and
  a rounded portion on the opposite side of the offset projection to facilitate both installing and removing of the insert, said locking pin working as a levering-pulling pin.

7. A locking pin according to claim 5
wherein the clamping head extending through a cylindrical type hole insert includes a barrel section only, the locking pin exercises a mainly horizontal clamping force against the lateral sides of the holder insert recess and whereas the vertical movement of the locking pin stops on the shim's hole transition surface, forcing the shim against bottom wall of the insert receiving recess,
said locking pin working as a levering pin.

8. A locking pin according to claim 5
wherein the clamping head extending through a countersink type hole insert has roughly a flipped foot shape that provides two contact points with the countersink surface of the cutting insert's hole, where the shape of the locking pin is achieved by modeling an original frustum of cone and where the two contact points belong to the original frustum of cone,
said locking pin working as a levering-pulling pin or as a pulling pin.

9. A locking pin according to claim 5
wherein the clamping head extending through a countersink type hole insert has roughly a finger shape leaned towards the horizontal arm of the locking pin and, providing one contact point with the surface of insert's hole, thereby securely retaining the cutting insert into the insert receiving pocket against the base wall and at least one side wall,
said locking pin working as a levering pin.

10. A locking pin according to claim 5
wherein the clamping head extending through a countersink type hole insert has roughly a finger shape leaned away from the horizontal arm of the locking pin and, providing two contact points with the surface of insert's hole, thereby securely retaining the cutting insert into the insert receiving pocket against the base wall and at least one side wall, said locking pin working as a pulling pin.

11. A locking pin according to claim 5
wherein the clamping head extending through a countersink type hole insert has roughly a finger shape leaned towards the horizontal arm of the locking pin and, providing two contact points with the surface of insert's hole, thereby securely retaining the cutting insert into the pocket against the base wall and at least one side wall,
said locking pin working as a pulling pin.

12. A cutting tool securing a cutting insert by the action of a screw, comprising:
a tool holder having an opening that includes:
  a pocket that has a base wall and at least one side wall for receiving the insert,
  a first hole on the base wall of the pocket,
  a second hole, positioned next to the pocket, containing the screw, and a passage extending from the bottom of the tool holder providing an opening between the first hole and the second hole;
and a locking pin including
a horizontal arm having
an enlarged portion in a half bushing shape located and trapped by the screw into the second hole of the tool holder,
and a reduced portion housed into the passage, making the joint between the enlarged portion and the vertical arm;
a vertical arm partially disposed within and aligned with the tool holder's first hole, said vertical arm having
a cylindrical portion
and a clamping head extending through the insert's hole, dimensioned to enable the insert to be positioned in its place by passing the insert's hole over,
wherein no shim is provided and the locking pin is installed from the bottom of the tool holder.

* * * * *